United States Patent
Lin et al.

(10) Patent No.: US 12,549,769 B2
(45) Date of Patent: Feb. 10, 2026

(54) VIDEO LATENCY IMPROVEMENT METHOD THROUGH PACKET DUPLICATION MECHANISM

(71) Applicant: MEDIATEK INC., Hsin-Chu (TW)

(72) Inventors: Ying-You Lin, Hsinchu (TW);
Chiao-Chih Chang, Hsinchu (TW);
He-Yuan Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 387 days.

(21) Appl. No.: 18/139,365

(22) Filed: Apr. 26, 2023

(65) Prior Publication Data
US 2023/0370643 A1    Nov. 16, 2023

Related U.S. Application Data

(60) Provisional application No. 63/341,435, filed on May 13, 2022.

(51) Int. Cl.
| H04W 76/15 | (2018.01) |
| H04L 47/2416 | (2022.01) |
| H04L 47/2483 | (2022.01) |
| H04N 19/67 | (2014.01) |
| H04W 28/04 | (2009.01) |
| H04L 1/1607 | (2023.01) |

(52) U.S. Cl.
CPC ......... *H04N 19/67* (2014.11); *H04L 47/2416* (2013.01); *H04L 47/2483* (2013.01); *H04W 28/04* (2013.01); *H04W 76/15* (2018.02); *H04L 1/1614* (2013.01); *H04L 1/1685* (2013.01)

(58) Field of Classification Search
None
See application file for complete search history.

(56) References Cited

U.S. PATENT DOCUMENTS

| 2008/0130496 | A1* | 6/2008 | Kuo | H04L 45/3065 |
| | | | | 370/230.1 |
| 2012/0230200 | A1* | 9/2012 | Wentink | H04L 1/1896 |
| | | | | 370/241 |
| 2014/0126580 | A1* | 5/2014 | Sampath | H04L 1/1858 |
| | | | | 370/428 |
| 2016/0255131 | A1* | 9/2016 | Bulava | H04L 65/70 |
| | | | | 709/219 |
| 2020/0367263 | A1 | 11/2020 | Cavalcanti | |
| 2021/0376965 | A1 | 12/2021 | Liu | |
| 2022/0014965 | A1* | 1/2022 | Kawamura | H04W 28/04 |
| 2024/0179558 | A1* | 5/2024 | Baek | H04W 80/02 |

FOREIGN PATENT DOCUMENTS

| EP | 2 959 693 B1 | 11/2017 |
| EP | 537 641 B1 | 4/2021 |
| WO | 2018/195775 A1 | 11/2018 |
| WO | 2020/007278 A1 | 1/2020 |

\* cited by examiner

*Primary Examiner* — Anh Vu H Ly
(74) *Attorney, Agent, or Firm* — Winston Hsu

(57) ABSTRACT

The present invention provides a control method of an electronic device, wherein the control method includes the steps of: obtaining a plurality of MPDUs, wherein the plurality of MPDUs corresponds to at least one I-frame and at least one P-frame; selectively duplicating the MPDUs corresponding to the I-frame to generate a plurality of duplicated MPDUs; and aggregating the plurality of MPDUS and the plurality of duplicated MPDUs in at least one PPDU.

23 Claims, 10 Drawing Sheets

VIDEO LATENCY IMPROVEMENT METHOD THROUGH PACKET DUPLICATION MECHANISM

CROSS REFERENCE TO RELATED APPLICATIONS

This application claims the benefit of U.S. Provisional Application No. 63/341,435, filed on May 13, 2022. The content of the application is incorporated herein by reference.

BACKGROUND

Virtual reality (VR) and augmented reality (AR) applications with interactions are usually delay-sensitive. For example, a bit rate of Wi-Fi transmission for the VR or AR applications should be ranging from 100 Mbps (million bits per second) to 200 Mbps, $75^{th}$ percentile video frame latency is preferred to be less than 5 ms (millisecond), $95^{th}$ percentile video frame latency is preferred to be less than 10 ms, and $99^{th}$ percentile video frame latency is preferred to be less than 50 ms. However, an overlapped basic service set (OBSS) scenario may cause much interference to Wi-Fi transmission which leads unpredictable channel fading and unpredictable latency. Therefore, if the OBSS interference causes a lot of packet errors, a packet retransmission mechanism will be triggered frequently, causing a large latency of packet transmission.

SUMMARY

It is therefore an objective of the preset invention to provide a control method of an electronic device, which duplicates at least a portion of MPDUS (Media access control (MAC) Protocol Data Unit) of intra-coded pictures (I-frames) actively, to solve the above-mentioned problems.

According to one embodiment of the present invention, a control method of an electronic device comprises the steps of: obtaining a plurality of MPDUs, wherein the plurality of MPDUS corresponds to at least one I-frame and at least one P-frame; selectively duplicating the MPDUs corresponding to the at least one I-frame or the at least one P-frame to generate a plurality of duplicated MPDUs; and aggregating the plurality of MPDUs and the plurality of duplicated MPDUs in at least one PPDU in at least one link among multiple links.

According to one embodiment of the present invention, a circuitry within an electronic device is configured to perform the steps of: obtaining a plurality of MPDUs, wherein the plurality of MPDUs corresponds to at least one I-frame and at least one P-frame; selectively duplicating the MPDUs corresponding to the at least one I-frame or the at least one P-frame to generate a plurality of duplicated MPDUs; and aggregating the plurality of MPDUs and the plurality of duplicated MPDUs in at least one PPDU in at least one link among multiple links.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 shows that part of the MPDUs of I-frame is duplicated and a PPDU comprises original MPDUs and duplicated MPDUs.

FIG. 7 shows that all the MPDUs of I-frame are duplicated, and original MPDUs and duplicated MPDUs are aggregated in different PPDUs.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
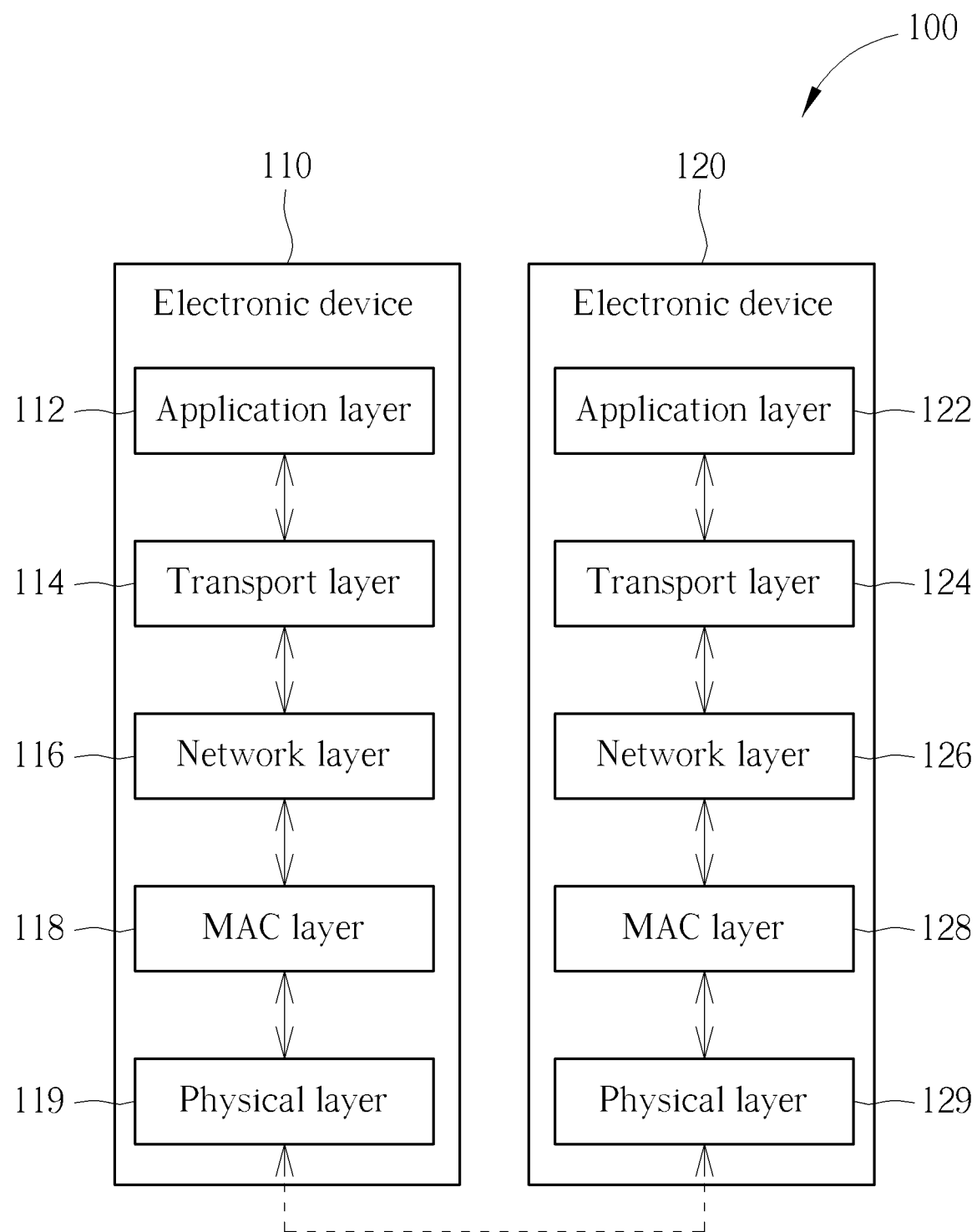
FIG. 1 is a diagram illustrating a wireless communication system according to one embodiment of the present invention.

FIG. 1 is a diagram illustrating a wireless communication system 100 according to one embodiment of the present invention. As shown in FIG. 1, the wireless communication system 100 comprises two electronic devices 110 and 120 capable of communicating with each other by using Wi-Fi. The electronic device 110 comprises a circuitry comprising an application layer 112, a transport layer 114, a network layer 116, a media access control (MAC) layer 118 and a physical layer 119. The electronic device 120 comprises a circuitry comprising an application layer 122, a transport layer 124, a network layer 126, a MAC layer 128 and a physical layer 129. In this embodiment, the electronic device 110 can be a notebook, a cell phone or any other electronic device capable of wirelessly generating video stream; and the electronic device 120 can be a virtual reality device, augmented reality device or any device having a display for receiving and displaying the video stream from the electronic device 110.

Figure 2:
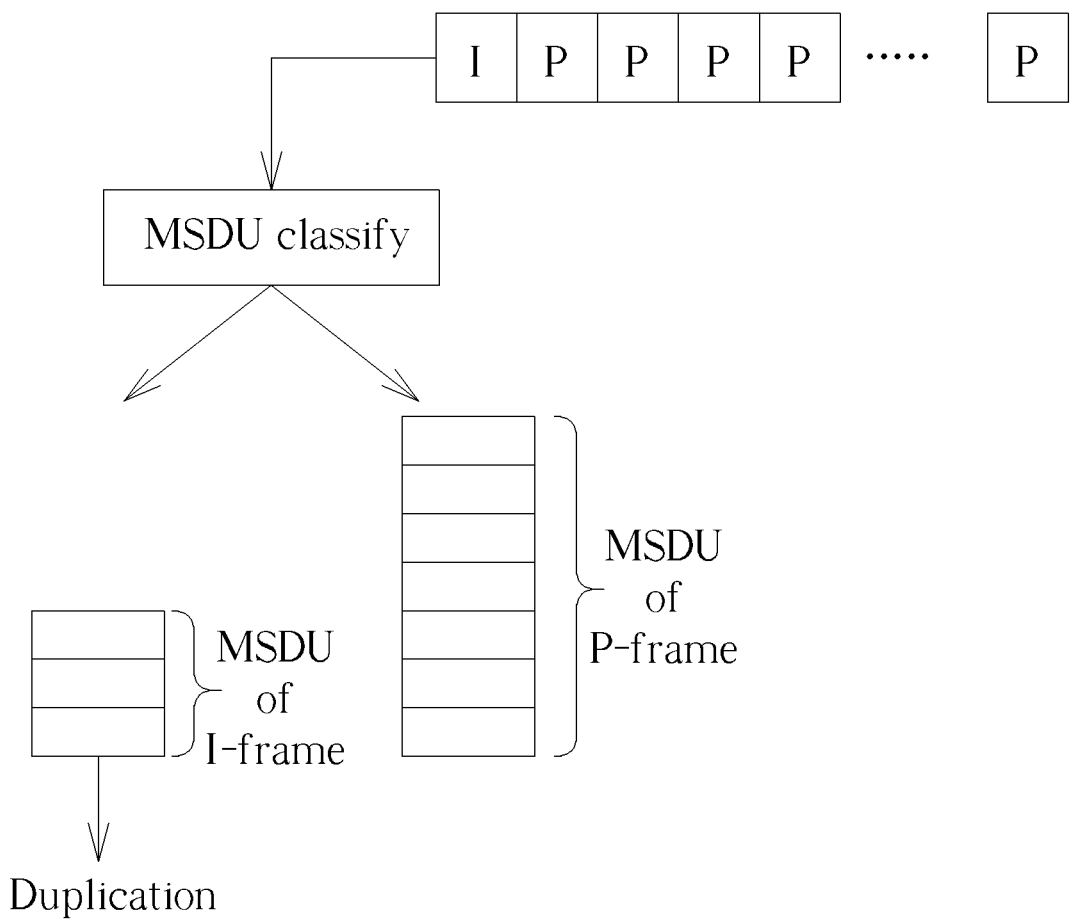
FIG. 2 shows classifying MPDUs of I-frame and MPDUs of P-frame.

In order to reduce the packet loss to shorten video frame latency of the video stream transmission between the electronic devices 110 and 120, the electronic device 110 actively performs packet duplication to increase the probability of the electronic device 120 successfully receiving the packets. Specifically, referring to FIG. 2, the application layer 112 generates Intra-frames (I-frame) and predicted frames (P-frame), wherein each I-frame is a key frame consists of macroblocks that use Intra-prediction, and each P-frame refers to previously encoded I/P-frames, and each P-frame allows macroblocks to be compressed using temporal prediction in addition to spatial prediction. The I-frame is the key frames that don't need other video frames to decode, and the P-frame is the forward-predicted frame and is more compressible than I-frames. The transport layer 114 tags/selects I-frames of a plurality of frames generated by the application layer 112, so that the network layer 116 can perform a classification operation such as a differentiated services code point (DSCP) mechanism to make MAC service data units (MSDU) of the I-frames and MSDUs of the P-frames belong to different groups. For example, without a limitation of the present invention, the MSDUs corresponding to the I-frame are classified to have a first traffic identity (TID), and the MSDUs corresponding to the P-frame are classified to have a second TID. Then, the MAC layer 118 generates MAC protocol data units (MPDU) according to the MSDUs, wherein each MPDU comprises a plurality of MSDUs. In one embodiment, one MPDU comprises the MSDUs belong to same group (e.g., the same TID), for example, all of the MSDUs within one MPDU may have the first TID so that this MPDU also has the first TID and corresponds to the I-frame; and all of the MSDUs within one MPDU may have the second TID so that this MPDU also has the second TID and corresponds to the P-frame. Then, the MAC layer 118 may duplicate part or all of the MPDUs corresponding to the I-frame, so that the MPDU corresponding to the I-frame has a copy. Finally, the physical layer 119 aggregates the MPDUs corresponding to the I-frame(s) and P-frame(s) to generate a physical layer protocol data unit (PPDU), and the PPDU are wirelessly transmitted to the electronic device 120.

Figure 3:
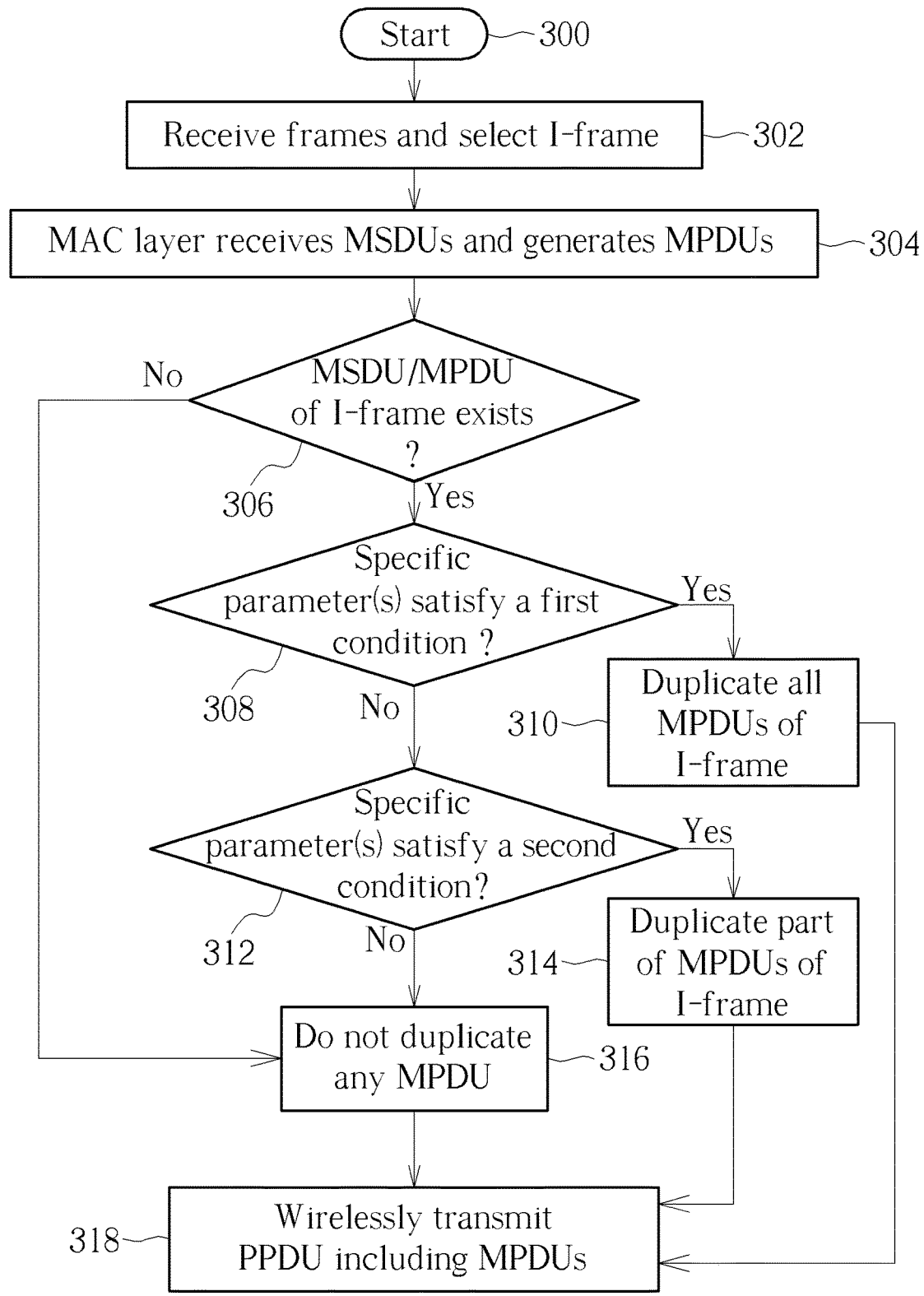
FIG. 3 is a flowchart of a control method of the electronic device according to one embodiment of the present invention.

FIG. 3 is a flowchart of a control method of the electronic device 100 according to one embodiment of the present invention. In Step 300, the flow starts, the electronic device 110 establishes at least one link with the electronic device 120, and the application layer 112 starts to generate a plurality of frames (image frames). In Step 302, the transport layer 114 receives the plurality of frames and selects I-frames from the plurality of frames. In Step 304, the MAC layer 118 receives MSDUs to generate MPDUs. In Step 306, the MAC layer 118 determines if the received MSDUs have one or more MSDUs corresponding to the I-frame, or the MAC layer 118 determines if the generated MPDUs have one or more MPDUs corresponding to the I-frame. If yes, the flow enters Step 308; and if not, the flow enters Step 316. In Step 308, the MAC layer 118 determines if one or more specific parameters of the electronic device 110 satisfy a first condition, if yes, the flow enters Step 310; and if not, the flow enters Step 312.

In a first embodiment, the specific parameter may be a packet error rate (PER), wherein the packet error rate can be calculated based on a number of packets not successfully received by the electronic device 120 and a number of packets transmitted from the electronic device 110 to the electronic device 120. For example, if the packet error rate is greater than a first threshold value, it is determined that the packet error rate satisfies the first condition, and the flow enters Step 310; and if the packet error rate is not greater than the first threshold value, it is determined that the packet error rate does not satisfy the first condition, and the flow enters Step 312.

In a second embodiment, the specific parameter may be an available bandwidth capable of being used to transmit the video stream to the electronic device 120. If the available bandwidth is greater than a threshold, it is determined that the available bandwidth satisfies the first condition, and the flow enters Step 310; and if the available bandwidth is not greater than the threshold, it is determined that the available bandwidth does not satisfy the first condition, and the flow enters Step 312.

In a third embodiment, the specific parameter may be an aggregation count of the MPDUs within one PPDU, that is how many MPDUS can be included in in a PPDU at most. If the aggregation count is available for adding the duplicated MPDUs in the PPDU, it is determined that the available bandwidth satisfies the first condition, and the flow enters Step 310; and if the aggregation count is not available for adding the duplicated MPDUs in the PPDU (e.g., too many MPDUs are generated), it is determined that the aggregation count does not satisfy the first condition, and the flow enters Step 312.

In one embodiment, the above three embodiments of the specific parameters can be considered together to determine if the specific parameters satisfy the first condition. For example, the first condition is satisfied only when the packet error rate is greater than the first threshold value, the available bandwidth is greater than the threshold, and the aggregation count is available for adding the duplicated MPDUs in the PPDU.

Figure 4:
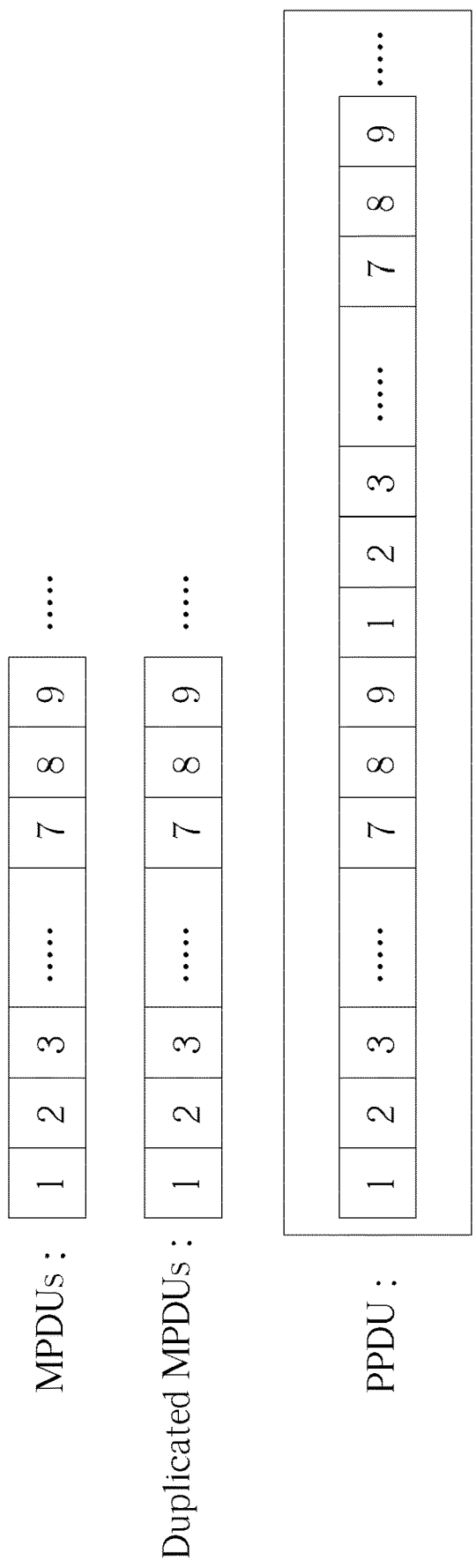
FIG. 4 shows that all the MPDUs of I-frame are duplicated and a PPDU comprises original MPDUs and duplicated MPDUs.

It is noted that the above embodiments for executing Step 308 are for illustrative, not a limitation of the present invention. That is, the above packet error rate can be replaced by any parameter capable of representing a packet transmission quality, and the available bandwidth and the aggregation count can be replaced by any parameter capable of representing an ability of processing the MPDUs. In one embodiment, the specific parameter can be one of SINR (Signal to Interference plus Noise Ratio), Doppler, Mobility Speed from smart phone GPS/GNSS, QOS priority, Application priority from smart phone In Step 310, the MAC layer 118 duplicates all of the MPDUs corresponding to the I-frame(s), and the original MPDUs and the duplicated MPDUs corresponding to the I-frame(s) are aggregated into one or more PPDUs. Taking FIG. 4 as an example, assuming that the MPDUs have the sequence number '1'-'9', the MAC layers duplicates the MPDUs so that the duplicated MPDUs have the same contents and also have the sequence number '1'-'9', and the MPDUS having the sequence number '1'-'9' and the duplicated MPDUs having the sequence number '1'-'9' are all aggregated into the PPDU.

In Step 312, the MAC layer 118 determines if one or more specific parameters of the electronic device 110 satisfy a second condition, if yes, the flow enters Step 314; and if not, the flow enters Step 316. In one embodiment, the specific parameter may be a packet error rate, and if the packet error rate is greater than a second threshold value lower than the first threshold value mentioned in Step 308, it is determined that the packet error rate satisfies the second condition, and the flow enters Step 314; and if the packet error rate is not greater than the second threshold value, it is determined that the packet error rate does not satisfy the second condition, and the flow enters Step 316. In another embodiment, the specific parameter may be an available bandwidth capable of being used to transmit the video stream to the electronic device 120. If the available bandwidth is greater than another threshold which is lower than the threshold mentioned in Step 308, it is determined that the available bandwidth satisfies the second condition, and the flow enters Step 314; and if the available bandwidth is not greater than the other threshold, it is determined that the available bandwidth does not satisfy the second condition, and the flow enters Step 316. In another embodiment, the specific parameter may be an aggregation count of the MPDUs within one PPDU, that is how many MPDUs can be included in in a PPDU at most. If the aggregation count is available for adding the duplicated MPDUs in the PPDU, it is determined that the available bandwidth satisfies the second condition, and the flow enters Step 314; and if the aggregation count is not available for adding the duplicated MPDUs in the PPDU (e.g., too many MPDUs are generated), it is determined that the aggregation count does not satisfy the second condition, and the flow enters Step 316.

Figure 5:
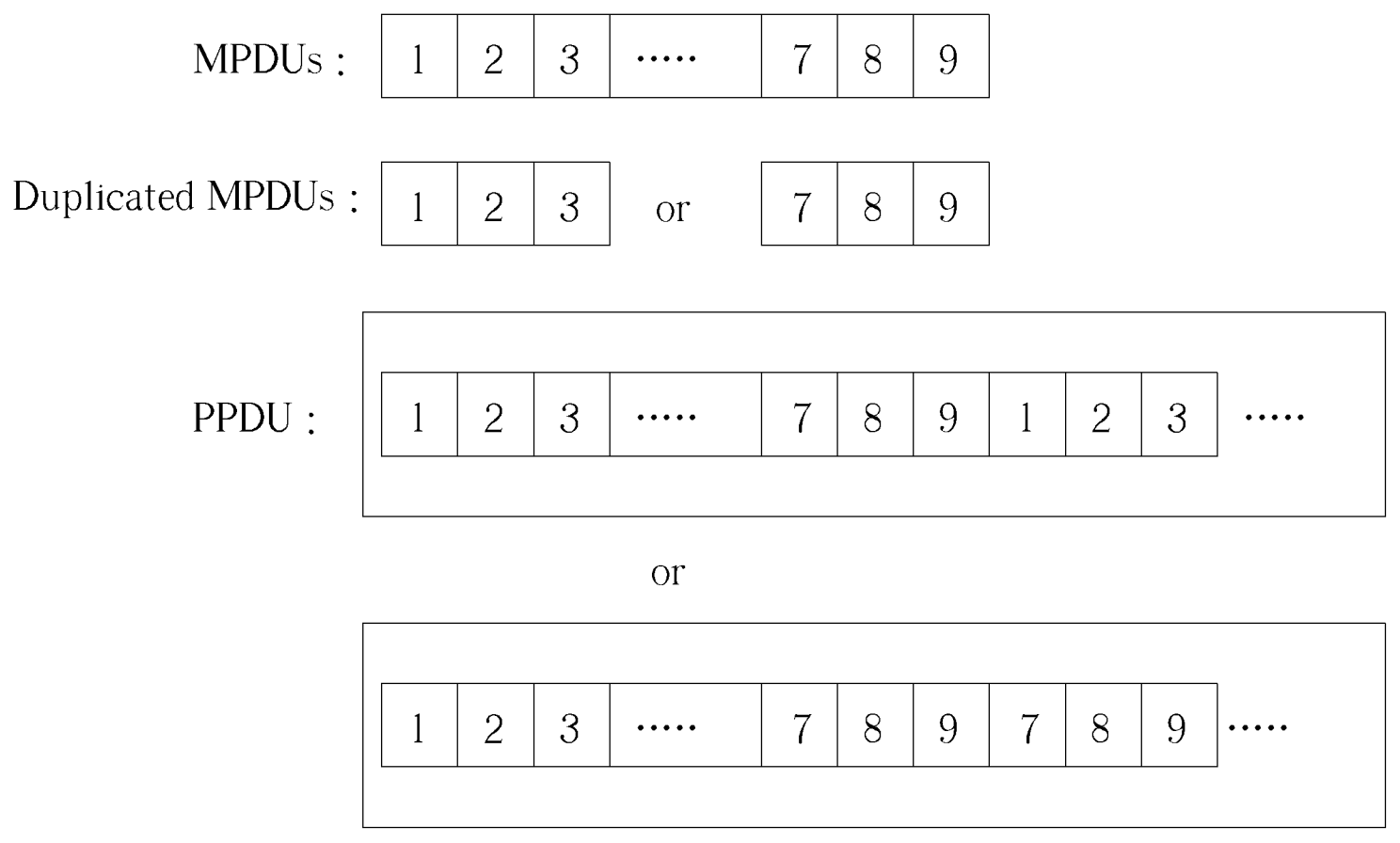

Step 314, the MAC layer 118 duplicates only part of the MPDUs corresponding to the I-frame(s), and the original MPDUs and the duplicated MPDUs corresponding to the I-frame(s) are aggregated into one or more PPDUs. Taking FIG. 5 as an example, assuming that the MPDUs have the sequence number '1'-'9', the MAC layer 118 may only duplicate the MPDUs having the sequence number '1'-'3' because the head of the PPDU is more prone to have packet collision issues, that is the duplicated MPDUs have the same contents as the original MPDUS with the sequence number '1'-'3', and the MPDUs having the sequence number '1'-'9' and the duplicated MPDUs having the sequence number '1'-'3' are aggregated into the PPDU. In another embodiment, the MAC layer 118 may only duplicate the MPDUs having the sequence number '7'-'9' because the tail of the PPDU has lower power in wireless transmission, that is the duplicated MPDUs have the same contents as the original MPDU with the sequence number '7'-'9', and the MPDUs having the sequence number '1'-'9' and the duplicated MPDUs having the sequence number '7'-'9' are aggregated into the PPDU.

In Step 316, the MAC layer 118 does not duplicate any MPDU, that is any two of the MPDUs aggregated in to the PPDU do not have the same sequence number.

In Step 318, the physical layer 119 wirelessly transmits the PPDU to the electronic device 120. After receiving the PPDU, the electronic device 120 can use a legacy circuitry to filter out the duplicated MPDU (if both the original MPDU and the duplicated MPDU are successfully received), for the following operations.

In the above embodiments shown in FIGS. 2-5, by actively duplicating part or all of the MPDUs corresponding to the I-frames, the probability of the electronic device 120 successfully receiving the MPDUs corresponding to the I-frames will become higher, and the video latency can be shortened. In addition, because the I-frames are basic frames for the decoding operation in the electronic device 120, successfully receiving the MPDUs corresponding to the I-frames t means that the video can be played fluently.

In the above embodiments, only the MPDUs corresponding to the I-frames are duplicated, so the PPDU may comprises the original MPDUS corresponding to the I-frame, the duplicated MPDUs corresponding to the I-frame and the original MPDUs corresponding to the P-frame. In an alternative embodiment, the MAC layer 118 may also duplicate part or all of the MPDUs corresponding to the P-frame, that is, the PPDU may comprises the original MPDUs corresponding to the I-frame, the duplicated MPDUs corresponding to the I-frame, the original MPDUS corresponding to the P-frame, and the duplicated MPDUs corresponding to the P-frame.

Figure 6:
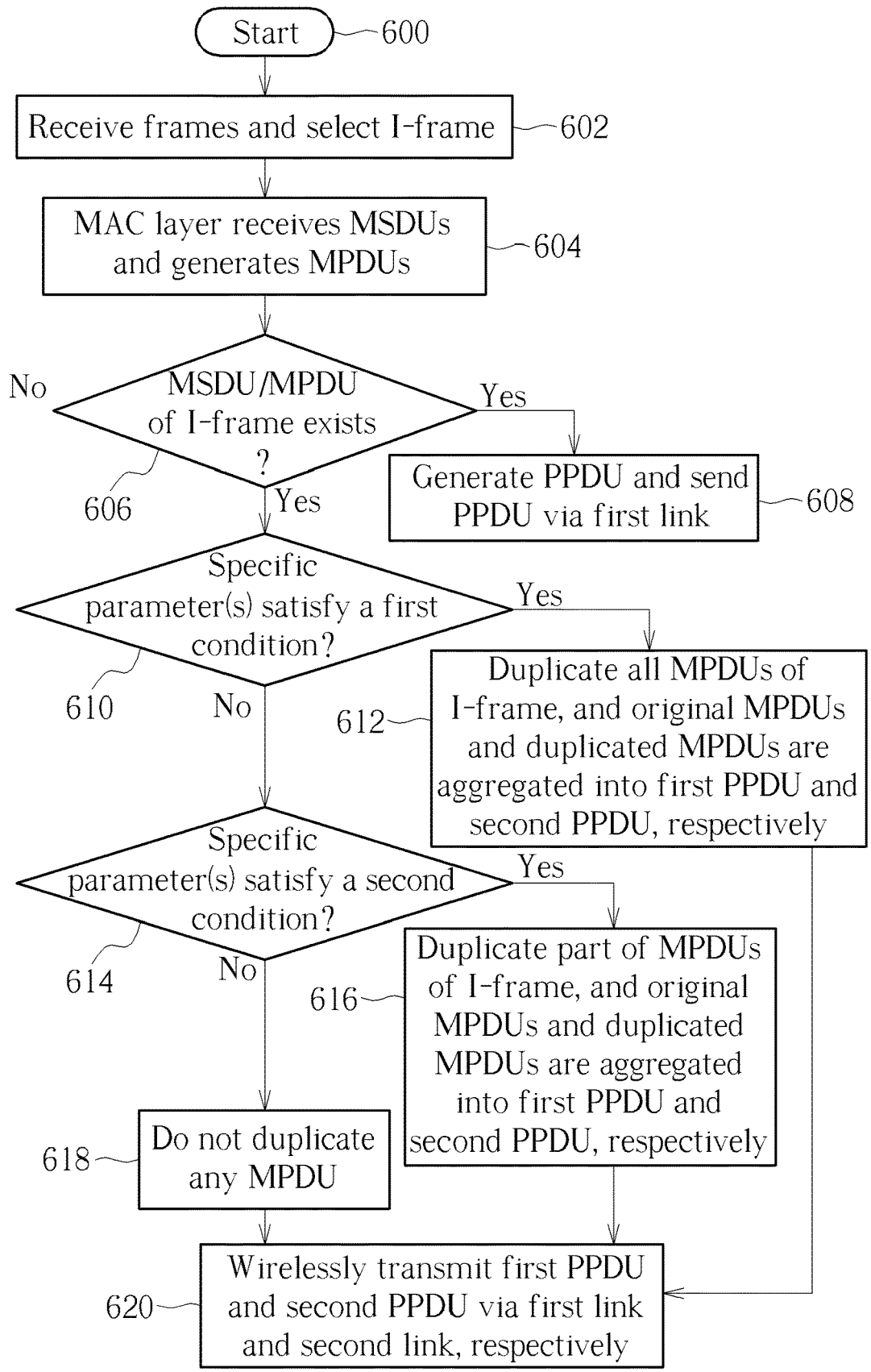
FIG. 6 is a flowchart of a control method of the electronic device according to one embodiment of the present invention.

In one embodiment, the electronic device 110 can establish multiple links with the electronic device 120, wherein the multiple links may correspond to different frequency bands or the same channel frequency. For example, the electronic device 110 may use channels belonging to a 2.4 GHz band and 5 GHz band (e.g., 4.915 GHz-5.825 GHz) to communicate with the electronic device 120 simultaneously, or the electronic device 110 may use channels belonging to a 2.4 GHZ band and 6 GHz band (e.g., 5.925 GHZ-7.125 GHZ) to communicate with the electronic device 120 simultaneously. Based on the multiple links established between the electronic device 110 and the electronic device 120, another control method of the electronic device 100 is provided in FIG. 6. In Step 600, the flow starts, the electronic device 110 establishes a first link and a second link with the electronic device 120, and the application layer 112 starts to generate a plurality of frames (image frames). In Step 602, the transport layer 114 receives the plurality of frames and selects I-frames from the plurality of frames. In Step 604, the MAC layer 118 receives MSDUs to generate MPDUs. In Step 606, the MAC layer 118 determines if the received MSDUs have one or more MSDUs corresponding to the I-frame, or the MAC layer 118 determines if the generated MPDUs have one or more MPDUs corresponding to the I-frame. If yes, the flow enters Step 610; and if not, the flow enters Step 608. In Step 608, the physical layer 119 aggregates the MPDUs in a PPDU, the PPDU is wirelessly transmitted to the electronic device 120 via the first link.

In Step 610, the MAC layer 118 determines if one or more specific parameters of the electronic device 110 satisfy a first condition, if yes, the flow enters Step 612; and if not, the flow enters Step 614. The operation of the Step 610 is similar to the Step 308 shown in FIG. 3, that is the specific parameter may be any parameter capable of representing a packet transmission quality, such as a packet error rate; or the specific parameter may be a parameter capable of representing an ability of processing the MPDUS, such as the available bandwidth and the aggregation count of the MPDUS in one PPDU.

Figure 7:
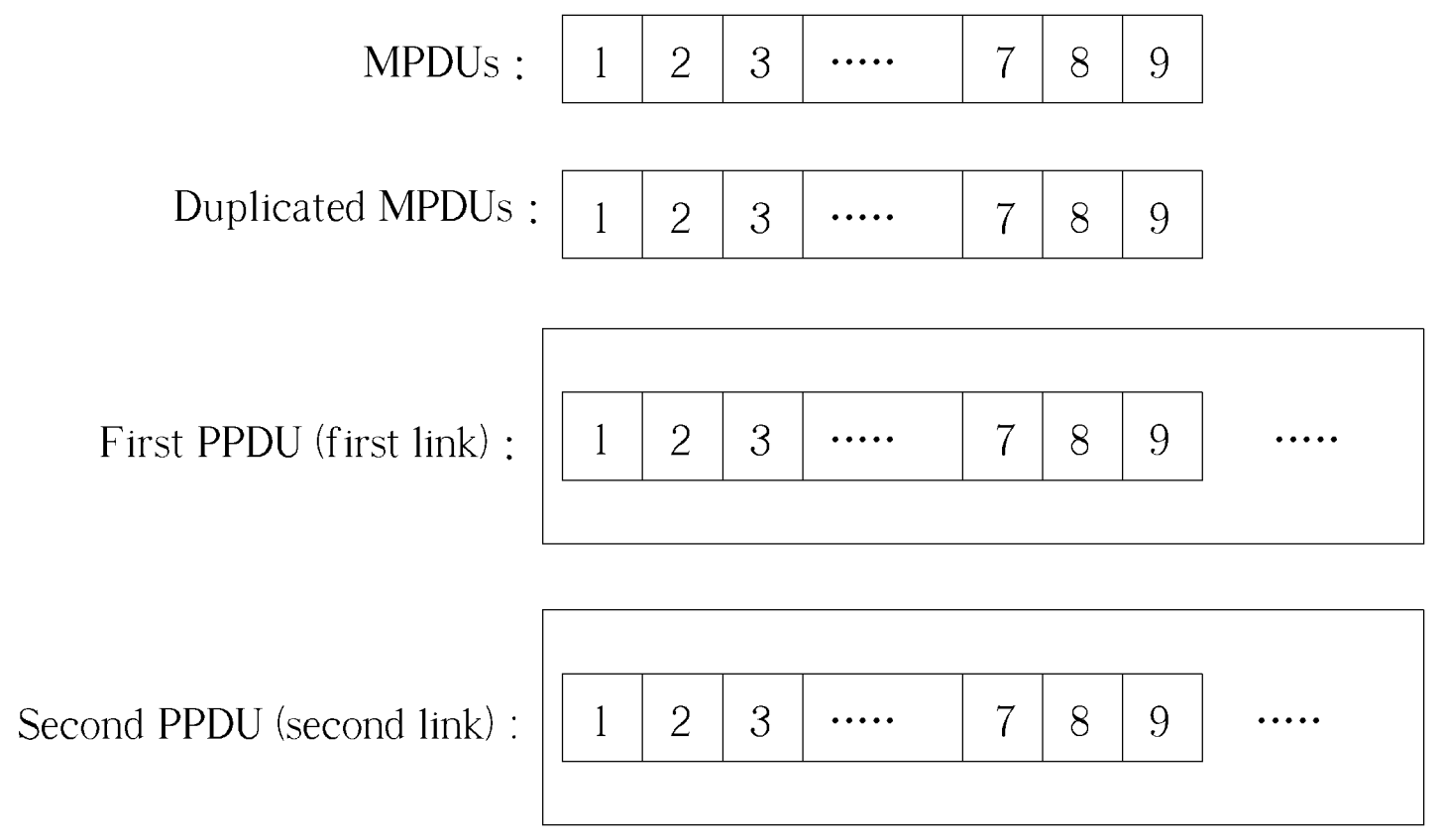

In Step 612, the MAC layer 118 duplicates all of the MPDUs corresponding to the I-frame(s), and the original MPDUs and the duplicated MPDUs corresponding to the I-frame(s) are aggregated to the PPDUs corresponding to different links. Taking FIG. 7 as an example, assuming that the MPDUs have the sequence number '1'-'9', the MAC layers duplicates the MPDUs so that the duplicated MPDUs have the same contents and also have the sequence number '1'-'9'. Then, the original MPDUs having the sequence number '1'-'9' are aggregated into a first PPDU that will be transmitted via the first link, and the duplicated MPDUs having the sequence number '1'-'9' are aggregated into a second PPDU that will be transmitted via the second link.

In Step 614, the MAC layer 118 determines if one or more specific parameters of the electronic device 110 satisfy a second condition, if yes, the flow enters Step 616; and if not, the flow enters Step 618. The operation of the Step 614 is similar to the Step 312 shown in FIG. 3, that is the specific parameter may be any parameter capable of representing a packet transmission quality, such as a packet error rate; or the specific parameter may be a parameter capable of representing an ability of processing the MPDUS, such as the available bandwidth and the aggregation count of the MPDUS in one PPDU.

Figure 8:
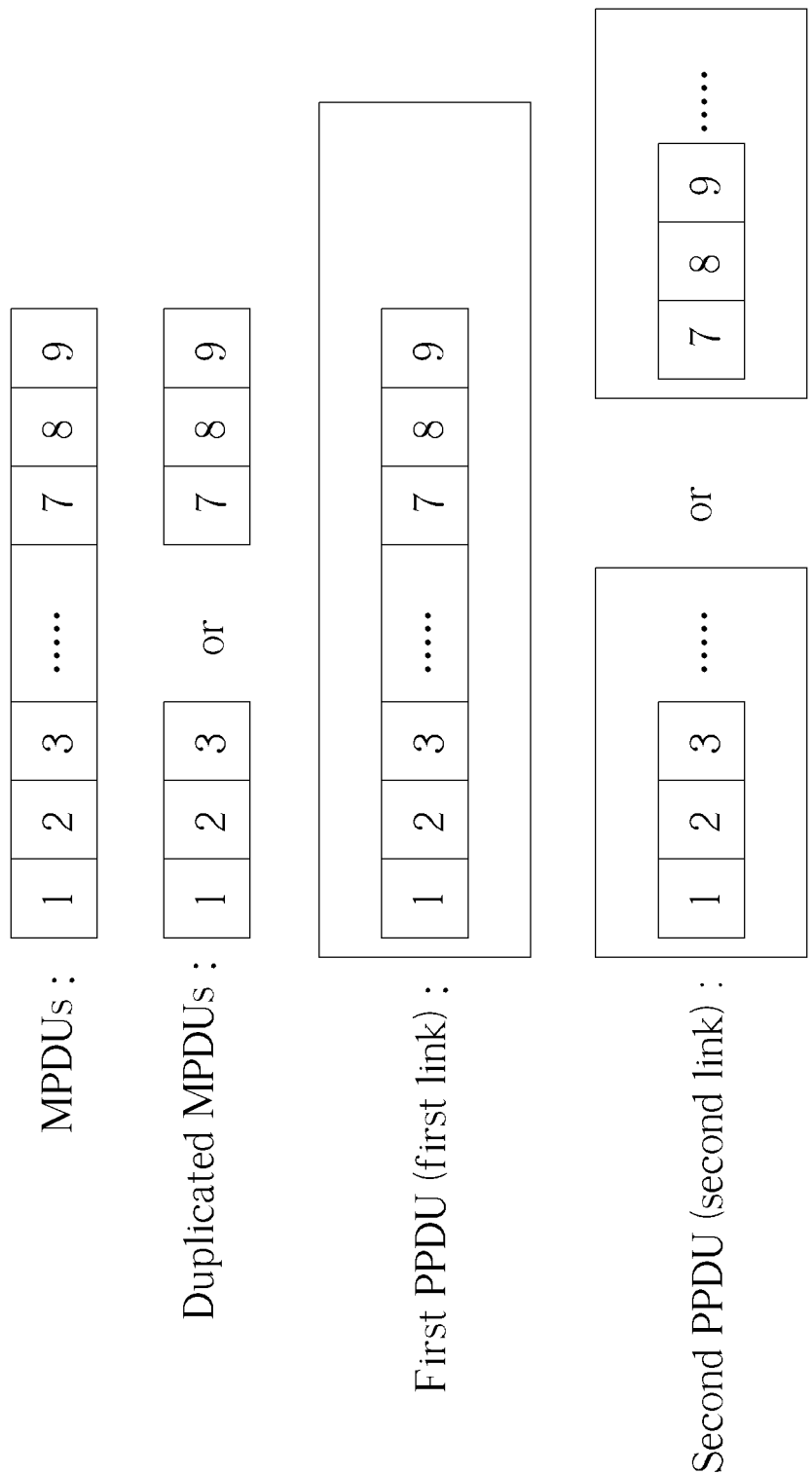
FIG. 8 shows that part of the MPDUs of I-frame is duplicated, and original MPDUs and duplicated MPDUs are aggregated in different PPDUs.

Step 616, the MAC layer 118 duplicates only part of the MPDUs corresponding to the I-frame(s), and the original MPDUS and the duplicated MPDUs corresponding to the I-frame(s) are aggregated into different PPDUs. Taking FIG. 8 as an example, assuming that the MPDUs have the sequence number '1'-'9', the MAC layer 118 may only duplicate the MPDUs having the sequence number '1'-'3' because the head of the PPDU is more prone to have packet collision issues, that is the duplicated MPDUs have the same contents as the original MPDUs with the sequence number '1'-'3'. Then, the original MPDUs having the sequence number '1'-'9' are aggregated into a first PPDU that will be transmitted via the first link, and the duplicated MPDUs having the sequence number '1'-'3' are aggregated into a second PPDU that will be transmitted via the second link. In another embodiment, the MAC layer 118 may only duplicate the MPDUs having the sequence number '7'-'9' because the tail of the PPDU has lower power in wireless transmission, that is the duplicated MPDUs have the same contents as the original MPDU with the sequence number '7'-'9'. Then, the original MPDUs having the sequence number '1'-'9' are aggregated into the first PPDU that will be transmitted via the first link, and the duplicated MPDUS having the sequence number '7'-'9' are aggregated into the second PPDU that will be transmitted via the second link.

In Step 618, the MAC layer 118 does not duplicate any MPDU, that is any two of the MPDUs aggregated in to the PPDU do not have the same sequence number.

In Step 620, the physical layer 119 wirelessly transmits the first PPDU and the second PPDU to the electronic device 120 via the first link and the second link, respectively. It is noted that the first PPDU may further have MPDUs corresponding to P-frames, and the second PPDU may also have other MPDUs.

Figure 9:
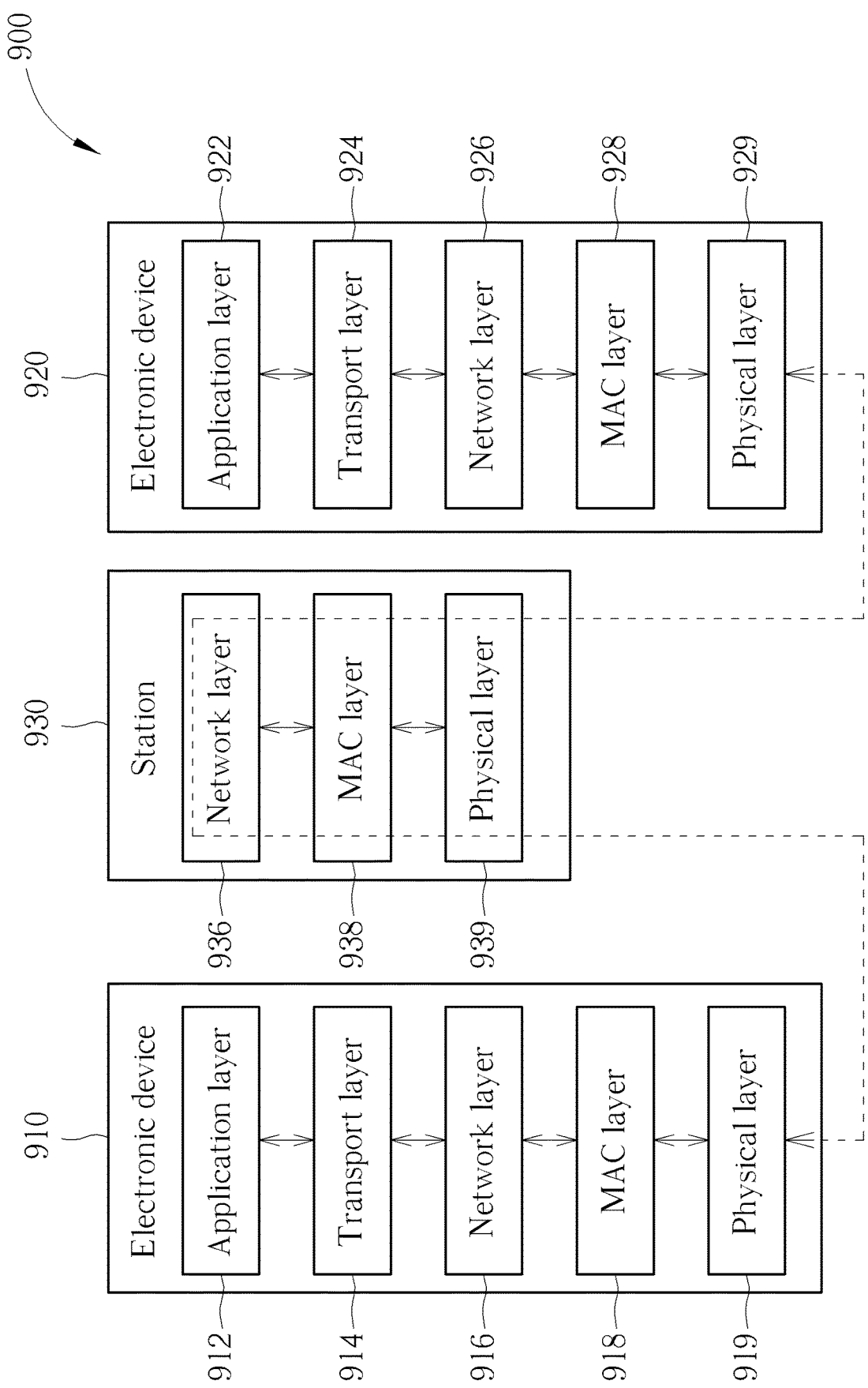
FIG. 9 is a flowchart of a control method of the electronic device according to one embodiment of the present invention.

FIG. 9 is a diagram illustrating a wireless communication system 900 according to one embodiment of the present invention. As shown in FIG. 9, the wireless communication system 900 comprises two electronic devices 910, 920 and a station 930 capable of communicating with each other by using Wi-Fi. The electronic device 910 comprises a circuitry comprising an application layer 912, a transport layer 914, a network layer 916, a MAC layer 918 and a physical layer 919. The electronic device 920 comprises a circuitry comprising an application layer 922, a transport layer 924, a network layer 926, a MAC layer 928 and a physical layer 929. The station 930 can be an access point (AP) router or a non-AP station, and the station 930 comprises a circuitry comprising a network layer 936, a MAC layer 938 and a physical layer 939. In this embodiment, the electronic device 910 can be a notebook, a cell phone or any other electronic device capable of wirelessly generating video stream; and the electronic device 920 can be a virtual reality device, augmented reality device or any device having a display for receiving and displaying the video stream from the electronic device 910 via the station 930.

In order to reduce the packet loss to shorten video frame latency of the video stream transmission between the electronic device 910 and the station 930, the electronic device 910 actively performs packet duplication to increase the probability of the station 930 successfully receiving the packets. Similar to the embodiment shown in FIG. 2, the application layer 912 generates I-frames and P-frames, the transport layer 914 tags/selects I-frames of a plurality of frames generated by the application layer 912, so that the network layer 916 can perform a classification operation to make MSDUs of the I-frames and MSDUs of the P-frames belong to different groups. For example, the MSDUs corresponding to the I-frame are classified to have a first TID, and the MSDUs corresponding to the P-frame are classified to have a second TID. Then, the MAC layer 918 generates MPDUs according to the MSDUs, and duplicates part or all of the MPDUs corresponding to the I-frame, so that the MPDU corresponding to the I-frame has a copy. Finally, the physical layer 919 aggregates the MPDUs corresponding to the I-frame(s) and P-frame(s) to generate a PPDU, and the PPDU are wirelessly transmitted to the station 930. The details of the above MPDU duplications are the same as the flowchart shown in FIG. 3.

After receiving the PPDU from the electronic device 910, the station 930 will filter output the duplicated MPDUs and regenerate the PPDU having the filtered MPDUs, and the regenerated PPDU is transmitted to the electronic device 920. In order to reduce the packet loss to shorten video frame latency of the video stream transmission between the station 930 and the electronic device 920, the electronic device 920 can actively send a request to the station 930 to request the station 930 to adopt the MPDU duplication mechanism.

Figure 10:
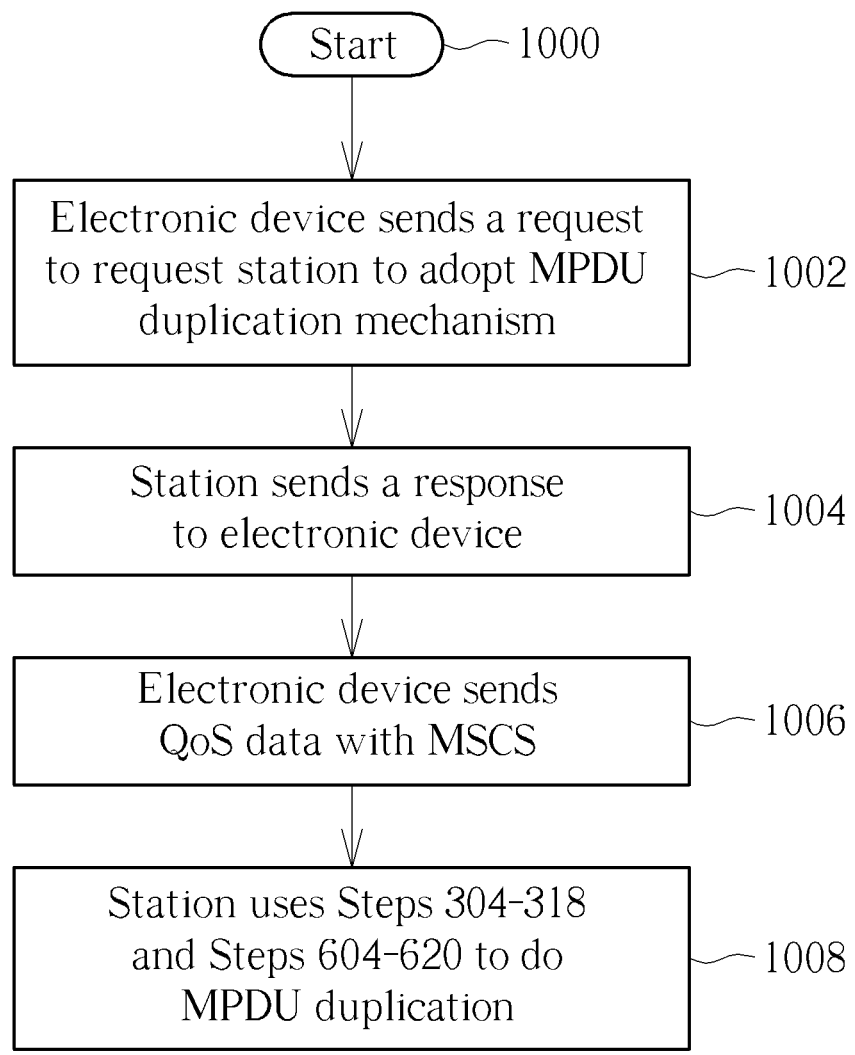
FIG. 10 is a flowchart of a control method of the electronic device shown in FIG. 9 according to one embodiment of the present invention.

FIG. 10 is a diagram illustrating a control method of the electronic device 920 and the station 930 according to one embodiment of the present invention. In Step 1000, the flow starts, and the station 930 has built links with the electronic device 910 and the electronic device 920. In Step 1002, the electronic device 920 sends a request to request the station 930 to adopt the MPDU duplication mechanism. In one embodiment, the request sent by the electronic device 920 can be combined with mirrored stream classification service (MSCS) protocol, which enables a device to request the other device to apply specific treatment of downlink IP flows using QoS (quality of service) mirroring. In Step 1004, after receiving the request, if the station 930 supports the MPDU duplication mechanism, the station 930 will send a response to the electronic device to inform that it supports the MPDU duplication mechanism. In Step 1006, because the station 930 cannot know which MPDU received from the electronic device 910 is required to be duplicated from the information provided by the electronic device 910, the electronic device 920 sends QOS data with MSCS to the station 930 to inform which MPDU can be duplicated. For example, the electronic device 920 can inform the station 930 that MPDU corresponding to a specific TID can be duplicated, wherein the specific TID corresponds to the MPDUs of the I-frame. In Step 1008, the station 930 uses the method of the Steps 304-318 or Steps 604-620 to duplicate the MPDUs of I-frames, and transmits the PPDU to electronic device 920.

Briefly summarized, in the embodiments of the present invention, by actively duplicating part or all of the MPDUS corresponding to the I-frames, the probability of the electronic device successfully receiving the MPDUs corresponding to the I-frames will become higher, and the video latency can be shortened. In addition, because the I-frames are basic frames for the decoding operation, successfully receiving the MPDUs corresponding to the I-frames t means that the video can be played fluently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic device, comprising:
   obtaining a plurality of media access control protocol data units (MPDU), wherein the plurality of MPDUs correspond to at least one Intra-coded frame (I-frame) and at least one predicted frames (P-frame);
   selectively duplicating the MPDUs corresponding to the at least one I-frame or the at least one P-frame to generate a plurality of duplicated MPDUs;

aggregating the plurality of MPDUs and the plurality of duplicated MPDUs in at least one physical layer protocol data unit (PPDU) in at least one link among multiple links;
classifying media access control service data units (MSDU) corresponding to the at least one I-frame into a first group;
generating the MPDUs corresponding to the I-frame according to the MSDUs of the first group;
classifying MSDUs corresponding the at least one P-frame into a second group; and
generating the MPDUs corresponding to the P-frame according to the MSDUs of the second group.

2. The control method of claim 1, further comprising:
determining whether at least one specific parameter of the electronic device satisfies a first condition to generate a first determination result; and
the step of selectively duplicating the MPDUs corresponding to the at least one I-frame or the at least one P-frame to generate the plurality of duplicated MPDUs comprises:
in response to the first determination result indicating that the at least one specific parameter of the electronic device satisfies the first condition, duplicating all of the MPDUs corresponding to the I-frame to generate the plurality of duplicated MPDUs.

3. A control method of an electronic device, comprising:
obtaining a plurality of media access control protocol data units (MPDU), wherein the plurality of MPDUs correspond to at least one Intra-coded frame (I-frame) and at least one predicted frames (P-frame);
selectively duplicating the MPDUs corresponding to the at least one I-frame or the at least one P-frame to generate a plurality of duplicated MPDUs;
aggregating the plurality of MPDUs and the plurality of duplicated MPDUs in at least one physical layer protocol data unit (PPDU) in at least one link among multiple links;
determining whether at least one specific parameter of the electronic device satisfies a first condition to generate a first determination result; and
the step of selectively duplicating the MPDUs corresponding to the at least one I-frame or the at least one P-frame to generate the plurality of duplicated MPDUs comprises:
in response to the first determination result indicating that the at least one specific parameter of the electronic device satisfies the first condition, duplicating all of the MPDUs corresponding to the I-frame to generate the plurality of duplicated MPDUs;
in response to the first determination result indicating that the at least one specific parameter of the electronic device does not satisfy the first condition, determining whether the at least one specific parameter of the electronic device satisfies a second condition to generate a second determination result; and
the step of selectively duplicating the MPDUs corresponding to the I-frame to generate the plurality of duplicated MPDUs comprises:
in response to the second determination result indicating that the at least one specific parameter of the electronic device satisfies the second condition, duplicating only part of the MPDUs corresponding to the I-frame to generate the plurality of duplicated MPDUs.

4. A control method of an electronic device, comprising:
obtaining a plurality of media access control protocol data units (MPDU), wherein the plurality of MPDUs correspond to at least one Intra-coded frame (I-frame) and at least one predicted frames (P-frame);
selectively duplicating the MPDUs corresponding to the at least one I-frame or the at least one P-frame to generate a plurality of duplicated MPDUs;
aggregating the plurality of MPDUs and the plurality of duplicated MPDUs in at least one physical layer protocol data unit (PPDU) in at least one link among multiple links;
wherein the step of aggregating the plurality of MPDUs and the plurality of duplicated MPDUs in at least one PPDU comprises:
aggregating the plurality of MPDUs and the plurality of duplicated MPDUs in one PPDU;
wherein the step of selectively duplicating the MPDUs corresponding to the at least one I-frame or the at least one P-frame to generate the plurality of duplicated MPDUs comprises:
duplicating only part of the MPDUs corresponding to the I-frame to generate the plurality of duplicated MPDUs.

5. A control method of an electronic device, comprising:
obtaining a plurality of media access control protocol data units (MPDU), wherein the plurality of MPDUs correspond to at least one Intra-coded frame (I-frame) and at least one predicted frames (P-frame);
selectively duplicating the MPDUs corresponding to the at least one I-frame or the at least one P-frame to generate a plurality of duplicated MPDUs;
aggregating the plurality of MPDUs and the plurality of duplicated MPDUs in at least one physical layer protocol data unit (PPDU) in at least one link among multiple links;
wherein the electronic device establishes a first link and a second link with another electronic device, and the step of aggregating the plurality of MPDUs and the plurality of duplicated MPDUs in the at least one PPDU comprises:
aggregating the plurality of MPDUs in a first PPDU;
aggregating the plurality of duplicated MPDUs in a second PPDU; and
the control method further comprises:
wirelessly transmitting the first PPDU to the another electronic device via the first link; and
wirelessly transmitting the second PPDU to the another electronic device via the second link.

6. A circuitry within an electronic device, configured to perform the steps of:
obtaining a plurality of media access control protocol data units (MPDU), wherein the plurality of MPDUs corresponds to at least one Intra-coded frame (I-frame) and at least one predicted frames (P-frame);
selectively duplicating the MPDUs corresponding to the at least one I-frame or the at least one P-frame to generate a plurality of duplicated MPDUs;
aggregating the plurality of MPDUs and the plurality of duplicated MPDUs in at least one physical layer protocol data unit (PPDU);
classifying media access control service data units (MSDU) corresponding to the at least one I-frame into a first group;
generating the MPDUs corresponding to the I-frame according to the MSDUs of the first group;
classifying MSDUs corresponding the at least one P-frame into a second group; and
generating the MPDUs corresponding to the P-frame according to the MSDUs of the second group.

7. The control method of claim 1, wherein the step of aggregating the plurality of MPDUs and the plurality of duplicated MPDUs in at least one PPDU comprises:
aggregating the plurality of MPDUs and the plurality of duplicated MPDUs in one PPDU.

8. The control method of claim 1, wherein the electronic device establishes a first link and a second link with another electronic device, and the step of aggregating the plurality of MPDUs and the plurality of duplicated MPDUs in the at least one PPDU comprises:
aggregating the plurality of MPDUs in a first PPDU;
aggregating the plurality of duplicated MPDUs in a second PPDU; and
the control method further comprises:
wirelessly transmitting the first PPDU to the another electronic device via the first link; and
wirelessly transmitting the second PPDU to the another electronic device via the second link.

9. The control method of claim 1, wherein the electronic device is an access point (AP) router or a non-AP station, and the electronic device is configured to wirelessly transmit the at least one PPDU to another electronic device, and the control method further comprises:
receiving a request from the another electronic device to request an MPDU duplication mechanism;
wherein the step of selectively duplicating the MPDUs corresponding to the I-frame to generate the plurality of duplicated MPDUs is executed after receiving the request from the another electronic device.

10. The control method of claim 3, further comprising:
classifying media access control service data units (MSDU) corresponding to the at least one I-frame into a first group;
generating the MPDUs corresponding to the I-frame according to the MSDUs of the first group;
classifying MSDUs corresponding the at least one P-frame into a second group; and
generating the MPDUs corresponding to the P-frame according to the MSDUs of the second group.

11. The control method of claim 3, wherein the step of aggregating the plurality of MPDUs and the plurality of duplicated MPDUs in at least one PPDU comprises:
aggregating the plurality of MPDUs and the plurality of duplicated MPDUs in one PPDU.

12. The control method of claim 3, wherein the electronic device establishes a first link and a second link with another electronic device, and the step of aggregating the plurality of MPDUs and the plurality of duplicated MPDUs in the at least one PPDU comprises:
aggregating the plurality of MPDUs in a first PPDU;
aggregating the plurality of duplicated MPDUs in a second PPDU; and
the control method further comprises:
wirelessly transmitting the first PPDU to the another electronic device via the first link; and
wirelessly transmitting the second PPDU to the another electronic device via the second link.

13. The control method of claim 3, wherein the electronic device is an access point (AP) router or a non-AP station, and the electronic device is configured to wirelessly transmit the at least one PPDU to another electronic device, and the control method further comprises:
receiving a request from the another electronic device to request an MPDU duplication mechanism;
wherein the step of selectively duplicating the MPDUs corresponding to the I-frame to generate the plurality of duplicated MPDUs is executed after receiving the request from the another electronic device.

14. The control method of claim 4, further comprising:
classifying media access control service data units (MSDU) corresponding to the at least one I-frame into a first group;
generating the MPDUs corresponding to the I-frame according to the MSDUs of the first group;
classifying MSDUs corresponding the at least one P-frame into a second group; and
generating the MPDUs corresponding to the P-frame according to the MSDUs of the second group.

15. The control method of claim 4, further comprising:
determining whether at least one specific parameter of the electronic device satisfies a first condition to generate a first determination result; and
the step of selectively duplicating the MPDUs corresponding to the at least one I-frame or the at least one P-frame to generate the plurality of duplicated MPDUs comprises:
in response to the first determination result indicating that the at least one specific parameter of the electronic device satisfies the first condition, duplicating all of the MPDUs corresponding to the I-frame to generate the plurality of duplicated MPDUs.

16. The control method of claim 4, wherein the electronic device establishes a first link and a second link with another electronic device, and the step of aggregating the plurality of MPDUs and the plurality of duplicated MPDUs in the at least one PPDU comprises:
aggregating the plurality of MPDUs in a first PPDU;
aggregating the plurality of duplicated MPDUs in a second PPDU; and
the control method further comprises:
wirelessly transmitting the first PPDU to the another electronic device via the first link; and
wirelessly transmitting the second PPDU to the another electronic device via the second link.

17. The control method of claim 4, wherein the electronic device is an access point (AP) router or a non-AP station, and the electronic device is configured to wirelessly transmit the at least one PPDU to another electronic device, and the control method further comprises:
receiving a request from the another electronic device to request an MPDU duplication mechanism;
wherein the step of selectively duplicating the MPDUs corresponding to the I-frame to generate the plurality of duplicated MPDUs is executed after receiving the request from the another electronic device.

18. The control method of claim 5, further comprising:
determining whether at least one specific parameter of the electronic device satisfies a first condition to generate a first determination result; and
the step of selectively duplicating the MPDUs corresponding to the at least one I-frame or the at least one P-frame to generate the plurality of duplicated MPDUs comprises:
in response to the first determination result indicating that the at least one specific parameter of the electronic device satisfies the first condition, duplicating all of the MPDUs corresponding to the I-frame to generate the plurality of duplicated MPDUs.

19. The control method of claim 5, wherein the step of aggregating the plurality of MPDUs and the plurality of duplicated MPDUs in at least one PPDU comprises:
aggregating the plurality of MPDUs and the plurality of duplicated MPDUs in one PPDU.

20. The circuitry of claim 6, further comprising:
  determining whether at least one specific parameter of the electronic device satisfies a first condition to generate a first determination result; and
  the step of selectively duplicating the MPDUs corresponding to the at least one I-frame or the at least one P-frame to generate the plurality of duplicated MPDUs comprises:
  in response to the first determination result indicating that the at least one specific parameter of the electronic device satisfies the first condition, duplicating all of the MPDUs corresponding to the I-frame to generate the plurality of duplicated MPDUs.

21. The circuitry of claim 6, wherein the step of aggregating the plurality of MPDUs and the plurality of duplicated MPDUs in at least one PPDU comprises:
  aggregating the plurality of MPDUs and the plurality of duplicated MPDUs in one PPDU.

22. The circuitry of claim 6, wherein the electronic device establishes a first link and a second link with another electronic device, and the step of aggregating the plurality of MPDUs and the plurality of duplicated MPDUs in the at least one PPDU comprises:
  aggregating the plurality of MPDUs in a first PPDU;
  aggregating the plurality of duplicated MPDUs in a second PPDU; and
  the control method further comprises:
  wirelessly transmitting the first PPDU to the another electronic device via the first link; and
  wirelessly transmitting the second PPDU to the another electronic device via the second link.

23. The circuitry of claim 6, wherein the electronic device is an access point (AP) router or a non-AP station, and the electronic device is configured to wirelessly transmit the at least one PPDU to another electronic device, and the control method further comprises:
  receiving a request from the another electronic device to request an MPDU duplication mechanism;
  wherein the step of selectively duplicating the MPDUs corresponding to the I-frame to generate the plurality of duplicated MPDUs is executed after receiving the request from the another electronic device.

\* \* \* \* \*